United States Patent [19]

Levashov et al.

[11] 3,782,244

[45] Jan. 1, 1974

[54] MACHINE FOR CUTTING STRAIGHT-TOOTH BEVEL GEARS

[76] Inventors: Gennady Vasilievich Levashov, N-Astrakhanskoe shosse, 37, kv. 76, Saratov; Sergei Nikiforovich Kalashnikov, I Kozhukhovsky proezd, 11 korpus "m" kv. 47; Ivan Ivanovich Glukhov, Rogozhinsky val, 13 korpus 8 kv. 40, both of Moscow; Mikhail Pavlovich Shemyrev, Ilinsky proezd, 11, kv. 1, Saratov, all of U.S.S.R.

[22] Filed: Mar. 22, 1972

[21] Appl. No.: 237,080

[52] U.S. Cl. .............................. 90/9, 90/10, 90/95
[51] Int. Cl. .................................................. B23f 1/08
[58] Field of Search ...................... 90/9, 10, 95, 96, 90/97

[56] References Cited
UNITED STATES PATENTS

| 2,288,058 | 6/1942 | Wildhaber et al. | 90/9 |
| 2,376,465 | 5/1945 | Wildhaber et al. | 90/9 |
| 2,448,426 | 8/1948 | Galloway | 90/9 |

*Primary Examiner*—Francis S. Husar
*Attorney*—John C. Holman et al.

[57] ABSTRACT

The machine is equally applicable both for rough and finish machining of the tooth space of a bevel gear being cut; it possesses an increased rigidity attainable due to the provision of a device for orienting the tool carriage with respect to the work spindle, defined as straight slideways and another straight slideways square with the former one, to provide setup motions of the tool carriage.

6 Claims, 4 Drawing Figures

MACHINE FOR CUTTING STRAIGHT-TOOTH BEVEL GEARS

BACKGROUND OF THE INVENTION

The present invention relates to machine tools for cutting straight-tooth bevel gears by the circular broaching method.

PRIOR ART

Known in the present-day metal-cutting practice is a prior-art straight bevel gear cutting machine using the circular broaching technique. In the known machine its bed mounts the stanchion which carries the workhead constituted by a swivel drum, in which the workspindle is mounted eccentrically with the drum axis. The workhead stanchion is mounted on the machine bed through the intermediary of a base sliding over the bed and having top sloping surfaces on which is located the plate whose surface contacting the base sloping surface is also inclined. On the surface of the plate opposite to that mentioned above, is mounted a flat swivel table, on which is located the workhead stanchion.

As a result of a great number of intermediate components and, consequently, of interlinking joints constituting the kinematic chain interconnecting the workhead stanchion and the machine bed, the tool-to-workpiece whain is considerably lengthened which renders the machine less rigid.

Thus, in the system "machine-tool-workpiece" are additionally introduced the sliding base, plate, flat swivel table, all of these with components adversely affecting the rigidity of said system and resulting in lower rigidity of the machine itself.

The bed also accommodates the tool carriage with the tool spindle, with said carriage having supports to take up axial thrust and another support to take up radial thrust. The carriage is mounted on the bed through the agency of a device adapted to orient the tool spindle with respect to the workspindle whose axis lies in a plane perpendicular to the plane of the tool spindle axis. Said orienting device is defined by straight slideways mounted on the machine bed. The construction of said slideways restricts the freedom of movement of the tool carriage with respect to the work spindle, since the slideways per se are held in positive with relation to a bed. Besides, the specificity of the direction of tool motion calls for the variation of the position of the workpiece axis in response to the variation of the root angle of the bevel gears being machined. This complicates automation of the machine operation, particularly automatic loading and conveying devices.

OBJECT AND SUMMARY OF THE INVENTION

It is an essential object of the present invention to provide such a machine for cutting straight-tooth bevel gears by the circular broaching method, which possesses a higher rigidity of the system machine - tool - workpiece as compared to the known machines of similar type, attainable by a reduced number of intermediate components involved in the abovesaid system.

The above and other objects are accomplished due to the provision of a machine for cutting straight-tooth bevel gears by the circular broaching method, whose bed mounts the stanchion carrying the workhead constituted by a swivel drum, in which the work spindle is mounted eccentrically with the axis thereof; a tool carriage provided with a tool spindle, said carriage having support to take axial thrust and another supports to take up radial thrust and being mounted on the machine bed via a device adapted to orient the tool carriage with respect to the work spindle whose axis lies in the plane perpendicular to the tool spindle axis, wherein according to the invention, the workhead stanchion is mounted directly on the machine bed and is oriented with the use of straight slideways for setup motions of the workhead stanchion, said slideways being arranged parallel to the work spindle on the machine bed having a recess to accommodate cylindrical ways whose axis is parallel to the tool spindle axis, while the device to orient the tool carriage with respect to the work spindle axis has a cylindrical portion mounted in the cylindrical ways of the machine bed.

One of the embodiments of the present invention is a machine, in which only rotary motion is imparted to the tool spindle during the cutting process, i.e., the spindle does not perform motion along the tooth space of the bevel gear being cut. Such an embodiment of the machine is applicable generally for rough machining of a gear blank.

With such an embodiment of the machine the cylindrical portion of the device for orienting the tool carriage with respect to the work spindle has an end face, on which straight slideways are provided for setup motions of the tool carriage, said slideways carrying the remaining part of said device accommodated in the bed recess and having another straight slideways square with those located on the end face of the device and adapted for setup motions of the tool carriage which is mounted directly on the machine bed.

Another embodiment of the present invention is a machine, in which during the cutting process the tool spindle apart from rotary motion has imparted thereto also rectilinear motion along the tooth space of the bevel gear being machined. Such an embodiment of the machine is applicable generally for finish machining of a gear blank.

In such a machine, according to the invention, the cylindrical portion of the device for orienting the tool carriage with respect to the work spindle on its end face carries the remaining portion of said device defined by a flat table located on the machine bed and having its own straight slideways square with those provided on the end face of the cylindrical portion of the aforementioned device, with said table slideways being adapted for the tool carriage to travel along the tooth space of the bevel gear being machined.

It is expedient that, to impart axial motion to the tool spindle, the latter be interconnected with the tool carriage supports adapted to take up axial thrust, through a screw pair adapted for setup motions of the tool spindle lengthwise of its axis, so that one of the elements of the screw pair is provided in the trunk of the tool spindle, while the other element is mounted with a possibility of only radial movement on a bar set in said supports of the tool carriage and capable of being axially held in position with respect to the tool spindle.

Still one more embodiment of the present invention is a machine for the finish machining of a gear blank, in which during the cutting process, the tool spindle, apart from rotary motion has imparted thereto also a circular-arcuate motion along the tooth space of the bevel gear being machined.

In such a machine, the cylindrical portion of the device for orienting the tool carriage with respect to the work spindle is defined by a drum adapted to swivel about its own axis in the bed cylindrical slideways during setup operations or within the cutting process, said drum carrying the tool spindle mounted eccentrically therewith and adapted to be moved by said drum along the space of the tooth being cut, while the straight slideways of the workhead stanchion are provided with auxiliary straight slideways locked-in therewith at a right angle and adapted for setup motions of a workhead stanchion in the plane perpendicular to the tool spindle axis, with the former slideways being accommodated in the workhead stanchion, with the latter ones, in the machine bed.

In what follows the present invention is disclosed in a detailed description of specific embodiments thereof to be had in conjunction with the appended drawings, wherein:

DETAILED DESCRIPTION OF THE INVENTION

Figure 1:
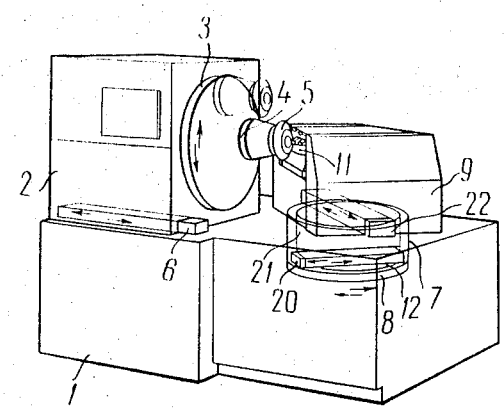
FIG. 1 is a schematic longitudinal-section view of a machine (in which no tool feed motion along the tooth space is provided) adapted for rough machining of the tooth space of the bevel gear being cut.
Figure 2:
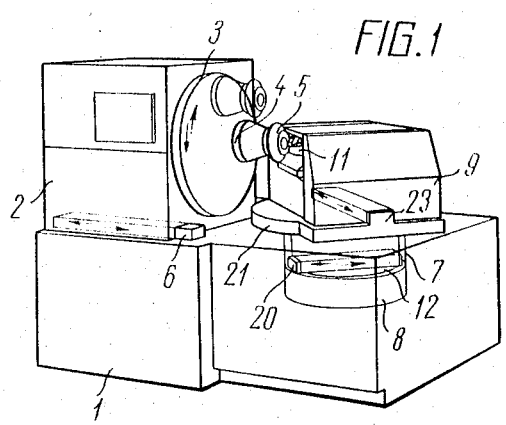
FIG. 2 is a similar view of a machine (in which a rectilinear tool feed motion along the tooth space is provided) adapted for finish machining of the tooth space of the bevel gear being cut.
Figure 3:
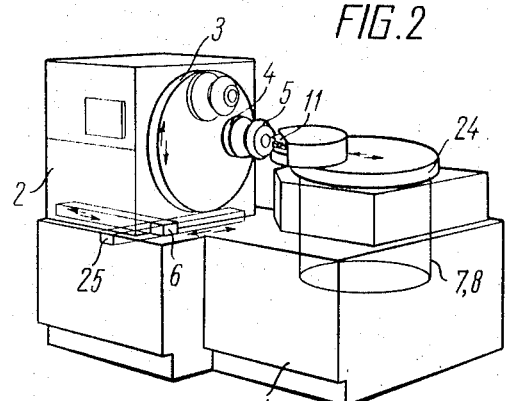
FIG. 3 is similar view of a machine (in which a circular-arcuate tool feed motion along the tooth space is provided) adapted for finish machining of the tooth space of the bevel gear being cut.

Reference is directed to FIGS. 1, 2 and 3, a machine bed 1 mounts a stanchion 2 which carries a workhead 3 defined by a swivel drum, wherein a work spindle 4 with a workpiece 5 is mounted eccentrically with respect to the drum geometrical axis. The position assumed by the stanchion 2 on the bed 1 (i.e., its orientation) is defined by straight slideways 6 (FIGS. 1, 2) arranged lengthwise of the work spindle axis. The movement of the stanchion 2 along the slideways 6 is a setup movement used for resetting the machine when bevel gears with different pitch cone lines are being processed.

The bed 1 has a recess 7 (FIGS. 1, 2, 3) to accommodate cylindrical slideways 8 (FIGS. 1,2) whose axis is parallel to the tool spindle axis.

The bed 1 accommodates a tool carriage 9 (FIGS. 1, 2) which is mounted via a device for orienting the tool carriage with respect to the work spindle. The tool carriage 9 mounts a tool spindle 10 (FIG. 4) provided with a cutting tool 11 (FIGS. 1, 2, 3, 4), i.e., a circular broach.

The device for orienting the tool carriage with respect to the work spindle has a cylindrical portion 12 (FIGS. 1, 2) which is mounted in the cylindrical slideways 8 of the bed 1. The axis of the cylindrical slideways is parallel to the axis of the tool spindle 10.

Readjustment of the machine required to bring in coincidence the planes of symmetry of the tool and workpiece, e.g., when broaches of different thicknesses are used, may be carried out by two ways.

The first way is to turn the workhead around its own axis through the use of a special device adapted for the purpose.

The device effecting said motion may be of any type and due to its being a simple and commonly known one, the device is thus beyond the scope of the present disclosure to describe in detail.

Figure 4:
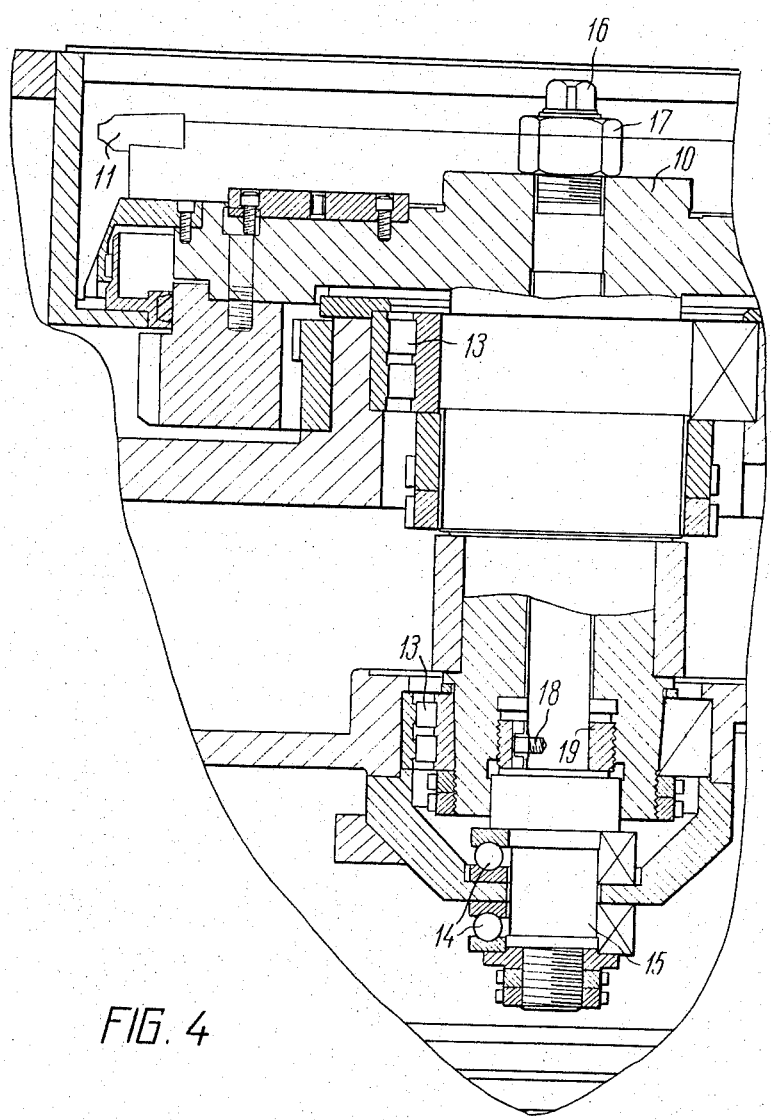
FIG. 4 is a section substantially along the axis of the tool spindle of FIG. 2.

The second way resides in imparting axial motion to the tool spindle by way of, say, the device illustrated in FIG. 4.

The tool carriage 9 has supports defined by bearings 13 adapted to take up radial thrust and bearings 14 adapted to take up axial thrust.

The tool spindle 10 is connected to the bearings 14, through a screw pair adapted for setup motions of the tool spindle 10 lengthwise the axis thereof.

A bar 15 is set in the bearings 14, and has at one of its ends a square shank and a thread with a nut 17. The bar carries a screw 19 on a key 18, with the screw serving as one of the elements of the screw pair. The screw 19 is capable of only radial motions on the bar, with this being due to its mounting on the thread of the tool spindle, and can be fixed in position in the axial direction with respect to the tool spindle 10.

Turning of the bar 15 with the tool spindle 10 kept against rotation, is transmitted through the key 18 to the screw 19, thus causing it to turn into the thread of the tool spindle 10, so that axial motion of the spindle 10 with respect to the bar 15 occurs.

In an embodiment of the machine (FIG. 1) applicable for the rough machining of a gear blank, in which the tool spindle 10 during the cutting process has imparted thereto only rotary motion and does not move along the tooth space of the bevel gear being cut with, the device for orienting the tool carriage with respect to the work spindle incorporating the cylindrical portion having on its end face straight slideways 20 adapted to carry a remaining portion 21 of said device.

The portion 21 of the device for orienting the tool carriage with respect to the work spindle is provided with another straight slideways 22 which is arranged square with the slideways 20 and carries the tool carriage 9. The portion 21 is accommodated in the recess 7 of the bed 1 with a clearance enabling it to perform all the required motions in the recess 7. The slideways 20 serve for setup motions of the tool carriage in the direction square with the tooth space of the gear being machined, while the slideways 22 is for setup motions of the tool carriage of the tooth space.

A substantial advantage of the above-discussed embodiment of the machine is the fact that the tool carriage 9 is mounted directly on the bed 1 which adds to the rigidity of the machine.

In an embodiment of the machine (FIG. 2) intended for the finish machining of a gear blank, the tool spindle during the cutting process performs rectilinear motion lengthwise of the tooth space of the gear being cut.

The device for orienting the tool carriage with respect to the work spindle is constituted (as in the machine embodiment discussed above) by two portions. The cylindrical portion 12 has on its end face the straight slideways 20 carrying the remaining portion 21 of the device. As distinct from the above-discussed design version, the remaining portion 21 of the orienting device is defined by a flat table mounted on the bed 1. The flat table 21 has, in turn, its own straight slideways 23 carrying the tool carriage 10. The slideways 23 serve for the tool carriage to travel lengthwise of the tooth space during the cutting process.

The embodiment of the machine illustrated in FIG. 3 is applicable for finish machining of a gear blank, in which the tool spindle 10, during the cutting process, is free to move lengthwise of the tooth space along a circular arc. In this case, according to the invention, the cylindrical portion of the device for orienting the tool carriage with respect to the workspindle is defined by a drum 24 mounted with a possibility of being swivelled during setup motions or in the course of cutting, around its own axis in cylindrical slideways which are the surface of the recess 7 of the bed 1. The tool spindle 10 is mounted in the drum 24 eccentrically to the axis thereof. During the cutting process, the tool 11 carried by the tool spindle 10 performs circular-arcuate motion of the tooth space of the gear being cut due to swiveling of the drum 24 in the cylindrical slideways of the bed.

With such a construction of the cylindrical portion of the device for orienting the tool carriage with respect to the work spindle provision should be made for an auxiliary setup motion of the workhead stanchion in the direction, say, square with the work spindle axis so as to compensate for wear of the cutting tool or to adjust the position of the contact pattern on the tooth surface.

To this end, the straight slideways 6 of the workhead stanchion 2 are provided with auxiliary straight slideways 25 rigidly held therewith at a right angle, with the slideways 6 being located in the workhead stanchion and the slideways 25, in the bed 1. Thus, the combination of the slideways 6 and 25 forms a cross key which enables workhead stanchion setup motions along a bed in the plane perpendicular to the tool spindle axis, and upon completing setup operations the workhead stanchion can be fixed directly on the bed.

Provision of the drums in the machine used as the tool carriage makes it possible to substantially increase the rigidity of the entire machine.

Moreover, the construction of the slideways enables automation of the loading and conveying operations which is of special importance under a large-scale production schedule for which purpose the present machines have been designed first and formost.

What is claimed is:

1. A machine for cutting straight-tooth bevel gears by the circular broaching method, comprising: a bed having a recess; a stanchion mounted directly on said bed; a tool carriage located on said bed; a tool spindle mounted on said tool carriage; supports adapted to take up radial thrust, said supports being mounted in said tool carriage; a workhead mounted on said stanchion and defined by a swivel drum; a work-spindle whose axis lies in a plane perpendicular to the axis of said tool spindle, said work spindle being mounted in the swivel drum eccentrically with the axis thereof; straight slideways for setup motions of said stanchion, said slideways being mounted on said bed parallel to the axis of said work spindle; said stanchion being oriented on said bed by way of said straight slideways; a cylindrical slideways accommodated in the recess of said bed, the axis of said cylindrical slideways being parallel to the axis of said tool spindle; a device for orienting said tool spindle with respect to said work spindle, said device having a cylindrical portion mounted in said cylindrical slideways of said bed; with said tool carriage mounted on said bed with the use of said orienting device.

2. A machine for cutting straight-tooth bevel gears by the circular broaching method, comprising: a bed having a recess; a stanchion mounted directly on said bed; a tool carriage located on said bed; a tool spindle mounted on said tool carriage; supports adapted to take up radial thrust, said supports being mounted in said tool carriage; a workhead mounted on said stanchion and defined by a swivel drum; a work spindle whose axis lies in a plane perpendicular to the axis of said tool spindle, said work spindle being mounted in the swivel drum eccentrically with with the axis thereof; straight slideways for setup motion of said stanchion, said slideways being mounted on said bed parallel to the axis of said work spindle; said stanchion being oriented on said bed by way of said straight slideways; cylindrical slideways accommodated in the recess of said bed, the axis of said cylindrical slideways being parallel to the axis of said tool spindle; a device for orienting said tool spindle with respect to said work spindle, said device having a cylindrical portion mounted in said cylindrical slideways of said bed; and the remaining portion of said device accommodated in the recess of said machine bed; said tool carriage mounted on said bed via said orienting device; another straight slideways adapted for setup moitions of said tool carriage and located on an end face of the cylindrical portion of said device for orienting the tool carriage with respect to the work spindle to carry the remaining portion of said orienting device; one additional straight slideways for setup motions of the tool carriage, said slideways being arranged on the remaining portion of said orienting device square with said straight slideways provided on the end face of said orienting device.

3. A machine for cutting straight-tooth bevel gears by the circular broaching method, comprising: a bed having a recess; a stanchion mounted directly on said bed; a tool carriage located on said bed; a tool spindle mounted on said tool carriage; supports adapted to take up radial thrust said supports being mounted in said tool carriage; a work-head mounted on said stanchion and defined by a swivel drum; a work spindle whose axis lies in a plane perpendicular to the axis of said tool spindle, said work spindle being mounted in the swivel drum eccentrically with the axis thereof; straight slideways for setup motion of said stanchion, said slideways being mounted on said bed parallel to the axis of said work spindle; said stanchion being oriented on said bed by way of said straight slideways; cylindrical slideways accommodated in the recess of said bed, the axis of the cylindrical slideways being parallel to the axis of said tool spindle; a device for orienting said tool spindle with respect to said work spindle, said device having a cylindrical portion mounted in said cylindrical slideways of said bed; and the remaining portion of said orienting device, being defined by a flat table located on said bed; another straight slideways adapted for setup motions of said tool carriage and located on an end face of the cylindrical portion of said orienting device to carry the remaining portion of said device; an additional straight slideways, on which the tool carriage is mounted, said slideways being adapted for the tool carriage to move lengthwise of the tooth space of the gear under machining and being arranged on the remaining portion of said orienting device square with said straight slideways provided on the end face of the cylindrical portion of said orienting device.

4. The machine as claimed in claim 2, wherein the tool spindle is interconnected with supports of the tool carriage adapted to take up axial thrust, through a screw pair adapted for setup motions of the tool spindle lengthwise of its axis, one of the elements of said pair being provided in the trunk of the tool spindle, while the other element is mounted with a possibility of only radial motion on a bar set in said supports of the tool carriage and capable of being held axially in position with respect to the tool spindle.

5. A machine as claimed in claim 3, wherein the tool spindle is interconnected with the supports of the tool carriage adapted to take up axial thrust, through a screw pair adapted for setup motions of the tool spindle lengthwise its axis, one of the elements of said pair being made in the trunk of the tool spindle, while the other element is mounted with the possibility of only radial motion on a bar set in said supports of the tool carriage and enabled to be axially held in position with respect to the tool spindle.

6. A machine for cutting straight-tooth bevel gears by the circular broaching method, comprising: a bed having a recess; a stanchion mounted directly on said bed; a tool carriage located on said bed; a tool spindle mounted on said tool carriage; supports adapted to take up radial thrust and mounted in said tool carriage; a workhead mounted on said stanchion and made as a swivel drum; a workspindle whose axis lies in the plane perpendicular to the axis of said tool spindle, said workspindle being mounted in the swivel drum eccentrically with the axis thereof; straight slideways for setup motions of said stanchion, mounted on said bed parallel to the axis of said workspindle; auxiliary straight slideways for setup motions of said workhead stanchion in the plane perpendicular to the axis of said tool spindle, said slideways being rigidly held at the right angle to said straight slideways of the workhead stanchion; one of said auxiliary straight slideways accommodated in said workhead stanchion; the other of said auxiliary straight slideways accommodated in said workhead stanchion; said stanchion oriented on said bed with the use of said straight slideways; cylindrical slideways accommodated in the recess of said bed, the axis thereof being parallel to the axis of said tool spindle; a device for orienting said tool spindle with respect to said workspindle, having a cylindrical portion mounted in said cylindrical slideways of said bed and made essentially as a drum mounted with the possibility of being swivelled during setup operations or in the course of cutting, round its own axis in said cylindrical slideways of said bed, said drum carrying the tool spindle mounted eccentrically to the drum axis and travelled by the latter lengthwise the space of the tooth being cut; said workhead mounted on said bed with the use of said orienting device.

* * * * *